(12) United States Patent
Norman et al.

(10) Patent No.: US 7,246,011 B2
(45) Date of Patent: Jul. 17, 2007

(54) COMBINED PARALLEL AND SEQUENTIAL DETECTION FOR GPS SIGNAL ACQUISITION

(75) Inventors: Charles P. Norman, Huntington Beach, CA (US); Stephen F. Rounds, Irvine, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 11/549,511

(22) Filed: Oct. 13, 2006

(65) Prior Publication Data

US 2007/0093961 A1 Apr. 26, 2007

(51) Int. Cl.
*G01C 21/26* (2006.01)
(52) U.S. Cl. ............... 701/213; 701/215; 342/357.06; 342/357.07; 342/357.09; 342/357.15
(58) Field of Classification Search ........ 701/213–215, 701/207; 342/357.01, 357.02, 357.06, 357.07, 342/357.09, 357.15; 455/456.1, 456.5, 456.6, 455/457, 436, 439
See application file for complete search history.

(56) References Cited

U.S. PATENT DOCUMENTS

| | | | | | |
|---|---|---|---|---|---|
| 5,347,284 | A | * | 9/1994 | Volpi et al. | 342/356 |
| 5,541,606 | A | * | 7/1996 | Lennen | 342/357.12 |
| 5,621,416 | A | * | 4/1997 | Lennen | 342/357.12 |

* cited by examiner

*Primary Examiner*—Gertrude A. Jeanglaude
(74) *Attorney, Agent, or Firm*—Jonathan W. Hallman; MacPherson Kwok Chen & Heid LLP

(57) ABSTRACT

A two part signal acquisition process includes a parallel signal detection process and signal verification/false alarm rejection process. A massively parallel architecture of acquisition correlators search a large region of the time-frequency uncertainty during the parallel signal detection process to identify the most likely detections for each search dwell. Concurrent with the parallel signal detection process performed by the acquisition correlators, the current list of most likely detections is examined with additional search dwells in the verification/false alarm rejection process. The verification/false alarm rejection process is performed by a plurality of independent correlators or tracking channels. Under software control, the tracking channels perform repeated dwells on the most likely detections until they can be dismissed as false alarms or verified as the desired signal.

10 Claims, 2 Drawing Sheets

COMBINED PARALLEL AND SEQUENTIAL DETECTION FOR GPS SIGNAL ACQUISITION

RELATED APPLICATIONS

This application claims the benefit of co-pending provisional application Ser. No. 60/214,462, filed Jun. 27, 2000.

BACKGROUND OF THE INVENTION

1. Field of the Invention

The invention relates generally to an apparatus and method for acquiring satellite signals and more particularly, to an apparatus and method for acquiring GPS signals that combines parallel and sequential detection processes.

2. Description of the Related Art

The requirements for fast acquisition in weak signal and high jamming environments has led the GPS industry to massively parallel architectures for both commercial and military applications. These massively parallel architectures comprise hundreds of thousands of correlators and dozens of FFT taps. This architecture allows searches of large regions of the time-frequency uncertainty domain in a single dwell of the acquisition engine. However, since all elements of the parallel architecture are treated equally, it has not been possible to realize the advantages of a sequential detector in minimizing the dwell time as a function of the dynamically observed signal and noise environment.

Typical GPS signal acquisition processes comprise two steps. In the first step of the process, the largest signal detected in an array of thousands of time/frequency cells is compared against a threshold. In the second step of the process, if the largest detected signal exceeds the threshold, a verification/false alarm rejection algorithm attempts to detect the signal again, multiple times to verify that the signal does indeed exceed the software threshold.

In the first step, the architecture of the GPS receiver, specifically the acquisition correlators, form a correlation output over the desired coherent and non-coherent integration period and report the time and frequency coordinates of the peak detected signal that exceeds a software-controlled threshold. Once these coordinates are reported, the architecture uses the same acquisition correlators previously used to detect the peak signal to attempt to detect the signal in multiple, repeated dwells to confirm the presence of the signal.

One drawback with this technique is the large sensitivity to the selected threshold. If the threshold is too high there is a large probability of a missed detection, if it is too low the search rate will be slowed due to false alarms. Another significant drawback to this GPS acquisition process is that it requires the reported signal to be the largest detected out of thousands of signals. Assuming that the desired probability of acquisition is 98%, this means that the probability that a noise sample exceeds the signal plus noise must not exceed a 2% missed detection probability. For a 511 correlator, 64-tap FFT architecture having 32,704 cells, this requires a signal-to-noise (S/N) ratio of 6.95. Achieving such a S/N ratio implies either a lower jam immunity/weak signal sensitivity, or an increase in the time-to-first-fix (TTFF) while the signal is integrated to the required S/N.

Hence, those skilled in the art have recognized the need for a GPS signal acquisition process having signal detection capability that is not so heavily dependent on the setting of a threshold level, as are current processes. The need has also been recognized for a process that retains the wideband search capabilities of existing massively parallel architectures, but also includes many of the advantages of a sequential detector.

SUMMARY OF THE INVENTION

Briefly, and in general terms, the present invention provides an apparatus and a process for acquiring GPS signals that employs an algorithm which may be characterized as a combined parallel/sequential detector. The first step of the process screens out the most likely detections using the massively parallel architecture of a GPS receiver. The screening step is followed by what is essentially a sequential detector—a verification/false alarm rejection algorithm that rejects a potential detection after any one of a number of steps unless it passes a threshold at each step.

Traditional acquisition algorithms have been shown to be sub-optimal for use with the massively parallel architectures that are required for acquisition of the GPS signal in a high jamming or weak signal environment. The present invention provides an improved acquisition algorithm which combines the best features of the parallel acquisition with the strengths of a sequential detector algorithm. A detailed implementation of this algorithm is described for two exemplary GPS receiver architectures. One architecture includes 511 acquisition correlators and a 64-tap FFT with six independent correlators for verification. A second architecture includes 240 acquisition correlators which can be configured as twelve independent correlators for verification. A mathematical analysis quantifies the advantages of the algorithm over more conventional designs. These analyses show that the required signal-to-noise for successful acquisition can be substantially reduced.

In a first aspect, the invention relates to a signal acquisition process that include a) performing an acquisition dwell on a plurality of cells within a time/frequency uncertainty range to detect a set of cells having the largest correlation peaks and b) performing an initial verification dwell on the set of cells detected in step a by comparing the peak of each cell to a threshold and retaining those cells having a peak at least as great as the threshold. The process further includes c) performing an acquisition dwell on another plurality of cells within the time/frequency uncertainty range to detect another set of cells having the largest correlation peaks and d) performing a subsequent verification dwell on the cells retained in step b and an initial verification dwell on the set of cells detected in step c by comparing the peak of each cell to the threshold and retaining those cells having a peak at least as great as the threshold.

In another aspect, the invention relates to a signal acquisition device that includes a plurality of acquisition correlators and a plurality of independent correlators. The acquisition correlators are adapted to perform an initial acquisition dwell and a series of subsequent acquisition dwells on a plurality of cells within a time/frequency uncertainty range. A set of cells having the largest correlation peaks is detected during each acquisition dwell. Each of the independent correlators is adapted to receive a detected cell from the acquisition correlators, perform an initial verification dwell on the detected cell by comparing the peak of the detected cell to a threshold and retaining the detected cell only if it has a peak at least as great as the threshold. The independent correlators are further adapted to perform at least one subsequent verification dwell on the retained cell.

In another aspect, the invention relates to a system for tracking the location of an object using signals transmitted by GPS satellites. The system includes an antenna associated with the object for receiving GPS signals and a signal acquisition device similar to the one described in the preceding paragraph. The signal acquisition device is in operative communication with the antenna and acquires and processes the GPS signals received by the antenna.

In another aspect, the invention relates to a signal acquisition process that includes performing a plurality of acquisition dwells on a plurality of cells within a time/frequency uncertainty range. Each acquisition dwell detects "x" number of cells having the largest correlation peaks. The process also includes comparing the cells detected during the acquisition dwells, retaining "x" number of cells having the largest correlation peaks and performing a verification dwell on the "x" number of cells by comparing the peak of each cell to a threshold and retaining only those cells having a peak that exceeds the threshold.

In another aspect, the invention relates to a signal acquisition device including a plurality of acquisition correlators, a processor implemented software list and a plurality of independent correlators. The plurality of acquisition correlators are adapted to perform acquisition dwells on a plurality of cells within a time/frequency uncertainty range to detect "x" number of cells having the largest correlation peaks. The software list is adapted to compare the cells detected during the acquisition dwells and retain "x" number of cells having the largest correlation peaks. Each of the plurality of independent correlators is adapted to receive a detected cell from the software list, perform an initial verification dwell on the detected cell by comparing the peak of the detected cell to a threshold and retaining the detected cell only if it has a peak at least as great as the threshold. The independent correlators are further adapted to perform a subsequent verification dwell on the retained cell.

In another aspect, the invention relates to a system for tracking the location of an object using signals transmitted by GPS satellites. The system includes an antenna associated with the object for receiving GPS signals and a signal acquisition device similar to the one described in the preceding paragraph. The signal acquisition device is in operative communication with the antenna and acquires and processes the GPS signals received by the antenna.

Benefits of the present invention include the performance of signal detection in the absence of a software-controlled threshold. As a result, there is no sensitivity to errors in threshold settings. The present invention also maximizes the use of the GPS receiver architecture by operating the tracking channels, i. e., independent correlators, to perform signal verification/false alarm in parallel within the signal detection correlators. The process of the present invention also looks at more possible detections than conventional processes. This provides improved probability of detection.

These and other aspects and advantages of the invention will become apparent from the following detailed description and the accompanying drawings which illustrate by way of example the features of the invention.

DETAILED DESCRIPTION OF THE PREFERRED EMBODIMENTS

Figure 1:
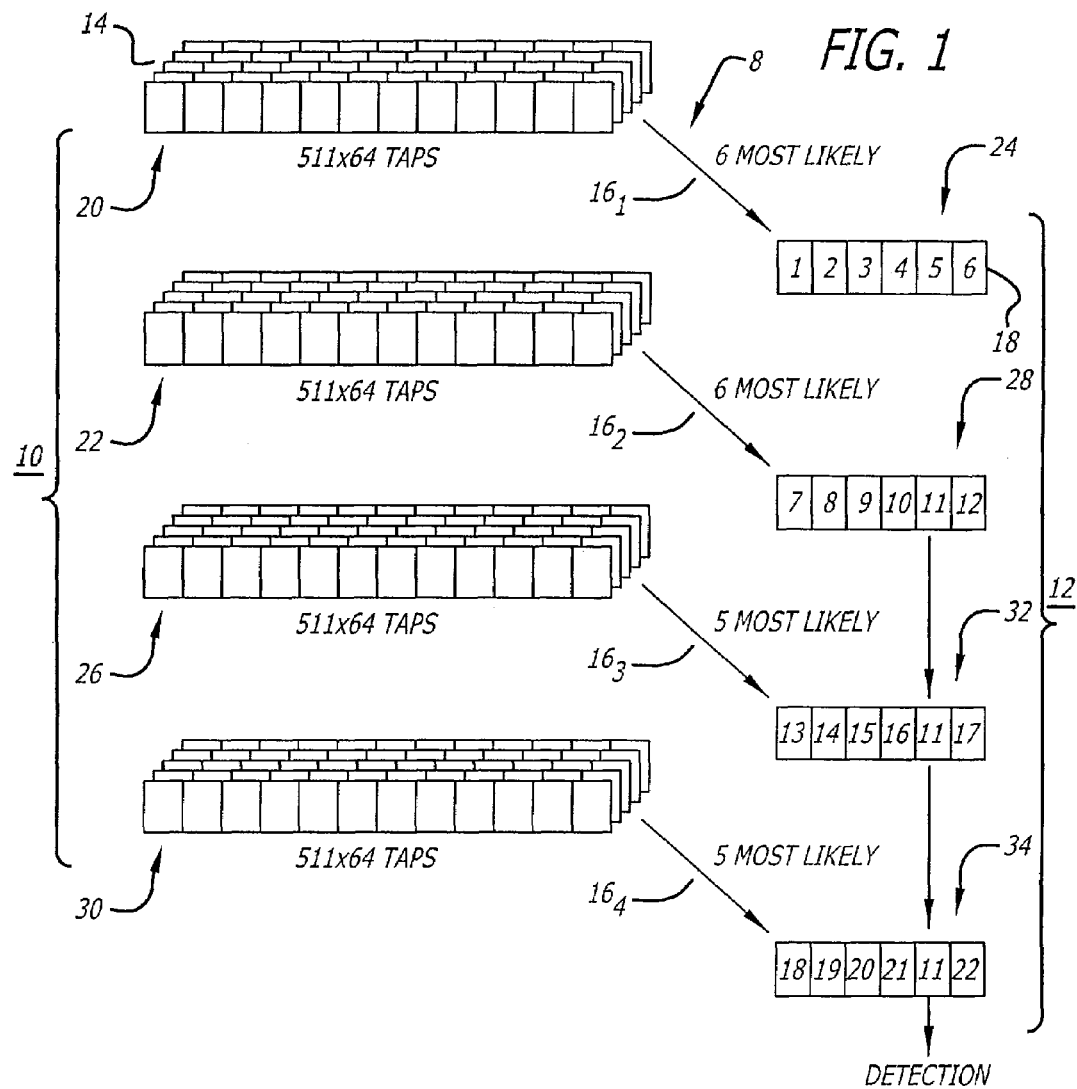
FIG. 1 is a block diagram of an acquisition process performed in accordance with one embodiment of the present invention.

Referring now to the drawings, wherein the reference numerals denote like or corresponding parts throughout the figures, and particularly to FIG. 1, there is shown a block diagram of an acquisition process 8 performed by an acquisition engine configured in accordance with one embodiment of the present invention. The acquisition engine is part of a GPS receiver which may be used in commercial or military application to track and monitor the location of moving objects such as automobiles and aircraft. Details of such tracking systems are well known to those skilled in the art and will not be described herein.

With reference to FIG. 1, the acquisition process 8 performed by the acquisition engine is divided into two steps: parallel signal detection 10 and signal verification/false alarm rejection 12. These two steps are distinct in both the software and the hardware implementations.

The parallel signal detection process 10 uses a massively parallel architecture of acquisition correlators 14 to quickly search a large contiguous region of the time-frequency uncertainty. The acquisition correlators 14 identify the most likely detections 16 for each search dwell. The dwell times for both coherent and non-coherent integration are chosen to achieve the desired sensitivity and/or jamming resistance. However, it is not necessary to extend the dwell times of this parallel process to unambiguously identify the signal, as this step is only the first step of a sequential detection process. Instead, it is only necessary that the true signal be included in a short list of most likely detections.

Concurrent with the parallel signal detection process 10 performed by the acquisition correlators 14, the current list of most likely detections 16 is examined with additional search dwells in the verification/false alarm rejection process 12. The verification/false alarm rejection process 12 is performed by a plurality of independent correlators 18, i. e., tracking channels. Under software control, the tracking channels 18 perform repeated dwells on the most likely detections 16 until they can be dismissed as false alarms, or verified as the desired signal.

By segregating the acquisition process 8 in this manner, the search of the large time-frequency uncertainty performed by the acquisition correlators 14 is limited to identifying likely detections via the parallel signal detection process 10. Only for these candidates is a signal verification/false alarm rejection process 12 performed. This combination utilizes the features of an acquisition engine according to its particular strengths; the massively parallel acquisition correlators 14 are used to quickly scan the large time-frequency uncertainty and the tracking channels 18 of the sequential detector accurately identifies the signal from the false alarms.

An ancillary, but not insignificant, benefit of this implementation is the elimination of the requirement for carefully chosen thresholds during the detection process 10. In fact, the parallel signal detection process 10 performed by the acquisition correlators 14 generates a fixed-length list of the most likely detections 16 without the use of thresholds. During the signal verification/false alarm rejection process 12 performed by the software controlled tracking channels 18, thresholds may be used. However, the algorithm used in the signal verification/false alarm rejection process 12 is inherently strong and threshold selection may be performed with minimal sensitivity to variation in the value of the threshold.

As described above, the acquisition process 8 is separated into a parallel signal detection process 10 and a verification/false alarm rejection process 12. These two processes are described separately below. Also provided below is an analysis of the algorithm used in the exemplary GPS receiver architecture.

Acquisition Process

The following descriptions are presented in the context of a GPS receiver architecture having 511 correlators and a 64-tap FFT, herein referred to as "the 511 architecture", which has the capability to simultaneously search 32,704 cells in the time-frequency uncertainty domain. The invention, however, is not limited to this exemplary GPS receiver architecture.

With continued reference to FIG. 1, the unique feature of the signal detection process 10 of the present invention is related to the most likely detections 16 reported to the software, i. e., software controlled tracking channels 18, by the signal processing hardware, i. e., acquisition correlators 14. Traditional architectures form a correlation output over the desired coherent and non-coherent integration period and report the peak detection that exceeds a software-controlled threshold. In accordance with the present invention, a GPS receiver may be configured to report a number of detections 16, any of which may be a GPS signal.

In a preferred embodiment, the acquisition correlators 14 may be configured to return the time/frequency coordinates of the six maximum detections 16 to provide the potential detections from the hardware to the software. The first advantage of this technique is that there is no threshold used at all, and therefore no sensitivity to an improperly calculated threshold. For the probability of detection, it is only required that the true signal be included in the list of the six strongest signals 16. This technique does imply that there will be false alarms that must be properly discriminated and therefore a strong false alarm rejection algorithm is required.

With continued reference to FIG. 1, the GPS receiver architecture may also include six tracking channels 18. These tracking channels 18 are controlled separately from the acquisition correlator 14, and are used for signal verification/false alarm rejection 12 in parallel with continued signal detection 10.

To implement the desired architecture, the time/frequency coordinates of the six largest signals $16_1$, or potential detections, are read from the GPS receiver upon completion of an initial acquisition dwell 20. The six sets of time/frequency coordinates of the potential detections $16_1$ from the initial acquisition dwell 20 are passed to the six tracking channels 18. The GPS receiver is then commanded to immediately resume the signal detection process 10 with a subsequent acquisition dwell 22 by searching the next 32,704 cells in the time/frequency uncertainty range using the acquisition correlators 14 for a subsequent set of most likely detections $16_2$ This guarantees that the acquisition process 8 continues, unperturbed by the signal verification/false alarm rejection process 12, which is performed in parallel.

Each tracking channel 18 is used as an independent correlator. Each of the six correlator power outputs $16_1$ (outputs 1-6) is compared to a software controlled threshold during an initial verification process 24, and those that fail to meet the threshold are discarded as false alarms while those that meet the threshold are retained in the tracking channels 18. With reference to FIG. 1, an exemplary initial verification process 24 yielded no outputs which met the threshold requirements thus the six most likely detections $16_2$ from the subsequent acquisition dwell 22 are passed to the set of six tracking channels 18.

The GPS receiver is then commanded to immediately resume the signal detection process 10 with a second subsequent acquisition dwell 26 while a subsequent verification process 28 is performed on the subsequent set of detections $16_2$ (outputs 7-12). In the exemplary subsequent verification process 28 shown in FIG. 1, one of the six outputs $16_2$ (output "11") has met the threshold and is retained in the tracking channels 18. Because output "11" has been retained, only the five most likely detections $16_3$ from the second subsequent acquisition dwell 26 are passed to the tracking channels 18. The GPS receiver again is commanded to immediately resume the signal detection process 10 with a third subsequent acquisition dwell 30 while a subsequent verification process 32 is performed on output "11" and the five new detections $16_3$. In the exemplary process of FIG. 1, previously retained output "11" has met the threshold again and is retained in the tracking channels 18 while each of the five new detections (outputs 13-17) have been discarded. Again, because output "11" has been retained, only the five most likely detections $16_4$ (outputs 18-22) from the third subsequent acquisition dwell 30 are passed to the tracking channels 18. In the last signal verification process 34 previously retained output "11" once again satisfies the software controlled threshold requirement and is declared the signal detection. By insisting that the detector power output, e. g., output "11", exceed the software threshold two or three times in a row the reliability of this process is increased.

Two drawbacks are immediately apparent from this false alarm/signal verification algorithm. The first is the return to reliance on a software computed threshold. While this is true, the analysis that follows demonstrates that the sensitivity to perturbations in this threshold is very small. Conceptually, this is because it is only necessary to detect the signal in the presence of five false alarms, rather than the original detection process which is trying to detect the signal in the presence of 32,703 potential false alarms.

The second drawback is the requirement for multiple detections prior to declaring a detection. Assuming that the signal verification/false alarm rejection dwell 24, 28, 32, 34 is of the same length as the acquisition dwell 20, 22, 26, 30, if a signal exceeds the threshold in the tracking channel 18, requiring that it be detected a second or third time allows only five remaining tracking channels to be used for subsequent signal verification/false alarm rejection processes. While this is true, thresholds can be set sufficiently high to limit this occurrence to negligibly small rates without compromising the probability of detection significantly. The foregoing is quantified in the probability analysis that follows.

Analysis of Algorithm

The probability of the success of the total algorithm includes the probability that the signal was detected, the signal verification process was successful, and that there were no false alarms. This can be represented as:

$$P_{success} = P_{det} * P_{ver} * Q_{FA}$$

where P is used to denote the probability of an event being successful, and Q represents the intrinsically-defined complementary probability that the event is not successful, where $P+Q \equiv 1$.

In performing the subsequent calculations, all probabilities are assumed to be Gaussian in nature. While some of these processes are more accurately defined by other distributions, the variations due to this simplification are felt to be small.

Analysis of Probability of Detection

The analysis begins with the assumption that the desired probability of acquisition for the first satellite is 98%. This is consistent with a desired probability of acquisition of enough satellites for a navigation solution of 95%. Obviously, the techniques identified below are valid for other probabilities, and it is a simple matter to repeat the analyses for alternate desired probabilities.

Given the architecture of the GPS chip, it is necessary to determine the probability that there are not six or more cell locations in which the measured power (due strictly to noise) is greater than the measured power in the cell which contains the signal (together with its noise). Given the 98% overall requirement, this determines the probability that the noise does not exceed the signal plus noise in any single cell.

Given this latter probability, it is straightforward to compute the S/N ratio that is required to meet or exceed this probability. The result is then the S/N ratio required to insure a single-satellite detection probability of 98%.

Probability that the Signal is in the Top Six

The probability that the signal is within the top six is the probability that there are exactly 0 cells which have noise which exceeds the signal plus noise, plus the probability of exactly 1, plus the probability of exactly 2, plus the probability of exactly 3, plus the probability of exactly 4, plus the probability of exactly 5:

$$P_{det} = \sum_{i=0}^{i=5} P(n=i)$$

The probability that there are exactly i detections, is given by the binomial probability function:

$$P(n=i) = \binom{N}{i} p^i q^{N-i}$$

where N=32703, q=1-p, p is the single-cell probability that the noise exceeds the signal plus noise, and $$\binom{N}{i} = \frac{N!}{(N-i)!i!}$$

Combining these equations gives:

$$P_{det} = 0.98$$

$$P_{det} = \sum_{i=0}^{i=5} \binom{N}{i} p^i q^{N-i}$$

Figure 2:
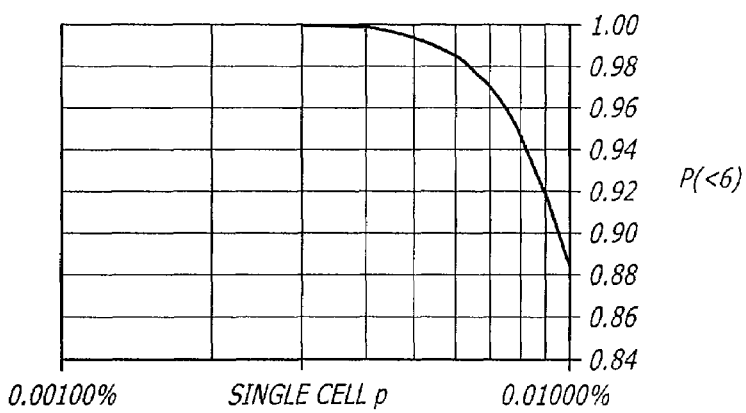
FIG. 2 is a graph showing the probability that less than six noise hits (out of 32,000) are larger than the signal as a function of the single cell probability.

A curve depicting $P_{det}$ vs. p is presented in FIG. 2. This shows that for the desired value of $P_{det}$=0.98, the required value of p is 0.0000639 (63.9 ppm).

Single Cell Probability of Detection

The remaining step is to determine the S/N ratio required to support the single-cell probability of high noise determined above. This can be stated as:

$$\text{Prob}\{S+X_1<X_2\}$$

where $X_1$ and $X_2$ are independent samples of a unit-variance, zero-mean, normal distribution.

This can be rewritten as:

$$\text{Prob}\{S<X_3\},$$

where $X_3 \equiv X_2-X_1$, and is a sample of zero-mean normal distribution with a variance of 2. With this simplification, a signal-to-noise ratio of 5.42 is required to achieve the desired single cell probability of 0.0000639.

Verification Algorithm

With the requirement imposed by the detection process that the S/N ratio must be 5.42, or higher, it is straightforward to design a strict verification algorithm. As described above, the algorithm to be used is to require multiple consecutive detections using a software-controlled threshold. The probability that the signal plus noise will exceed the threshold is a straight cumulative Gaussian probability:

$$\text{Prob}\{X>T/N-S/N\},$$

where X is a zero mean, unit variance random variable, T/N is the threshold-to-noise ratio, and S/N is the signal-to-noise ratio.

The probability of false alarm is similarly straightforward:

$$\text{Prob}\{X>T/N\}.$$

Using a value of 2.7 for T/N gives a 99.65% probability of correctly verifying the true signal, and only a 0.35% probability of falsely verifying a false alarm. Requiring two consecutive verification dwells using a lower threshold provides an even more robust verification algorithm. For example, using a T/N ratio of 2.0, requiring two consecutive verifies would correctly confirm 99.93% of true signals, and would falsely verify only 0.052% of false alarms. Increasing the number of consecutive verifications that are required can provide an even more robust algorithm, although this rapidly reaches a point of diminishing returns.

While requiring a false alarm probability as low as 0.052% may seem unnecessarily restrictive, it must be remembered that in each dwell there are six false alarms which must be rejected, and the number of dwells may be very large if a large time/frequency uncertainty must be searched. For example, if the total time uncertainty is ±10 msec, and the frequency uncertainty is ±1 ppm, it will require about 1900 search dwells to span the entire time/frequency uncertainty (assuming a 20 msec coherent integration time), and therefore about 11,400 successful false alarm rejections. In fact if the total false alarm rate is meant to be kept to less than 1%, the individual false alarm rate is given by:

$$Q_{fa}^{11400}>99\%$$

$$P_{fa}<0.88 \text{ ppm}$$

This false alarm rate would require a T/N ratio setting of greater than 3.1, which would compromise the probability of detection (it would degrade by about 1%). Therefore, the selected strategy is to require three consecutive verifications, using a T/N ratio value of 2.35. This results in a probability of verification of 99.9%, and a probability of false alarm of <1% (assuming a S/N of >5.42, and measuring the false alarm probability over the entire ±10 msec/±1 ppm time/frequency uncertainty range).

Total Probability of Success

Combining the separate probabilities, the total probability of success is given as:

$$P_{success} = P_{det} * P_{ver} * Q_{FA}$$

$$P_{success} = 0.98 * 0.999 * 0.99$$

$$P_{success} = 0.969$$

These probabilities are for successfully acquiring the first satellite in a S/N environment of 5.42, while searching the time/frequency uncertainty range of ±10 msec/±1 ppm.

The advantages of the algorithm are best viewed by contrasting it with the acquisition algorithm of a conventional receiver. In such a receiver, the largest detection in the array of the same 32,704 time/frequency cells is compared against a threshold. If it exceeds the threshold, the signal verification/false alarm rejection algorithm uses the same acquisition correlators that are used to attempt to detect the signal in multiple dwells to confirm the presence of the signal.

The biggest drawback to such a scheme is that it requires the signal to be the largest detection. Mathematically, this means that the probability that a noise sample exceeds the signal plus noise must not exceed the allowable 2% missed detection probability. For the same 32,704 cells, this requires a S/N ratio of 6.95 (as compared with 5.42 for the algorithm described above). Achieving such a S/N ratio implies either a lower jam immunity/weak signal sensitivity, or an increase in the TTFF while the signal is integrated to the required S/N ratio.

This points out the qualitative differences between the detection algorithm for a massively parallel architecture as compared with algorithms which have proven successful in the past for more limited architectures. While previous detection algorithms have had to be concerned with setting thresholds for signal detection and less concerned with false alarms masking the signal, the existence of a large number of time/frequency cells being searched in parallel increases the importance of false alarms.

The algorithm described herein addresses this issue in two ways. First, instead of the hardware reporting only a single potential detection, it reports multiple detections. This vastly reduces the complexity of the problem to verifying the existence of the true signal from among a handful of potential detections. The second significant aspect is that the tracking channels are used for verification/false alarm rejection in parallel with the main acquisition correlators. Given the importance that has been transferred to this second half of the algorithm, it is imperative that this be performed in parallel, thereby maintaining the rapid acquisition capabilities of the massively parallel architecture.

Figure 3:
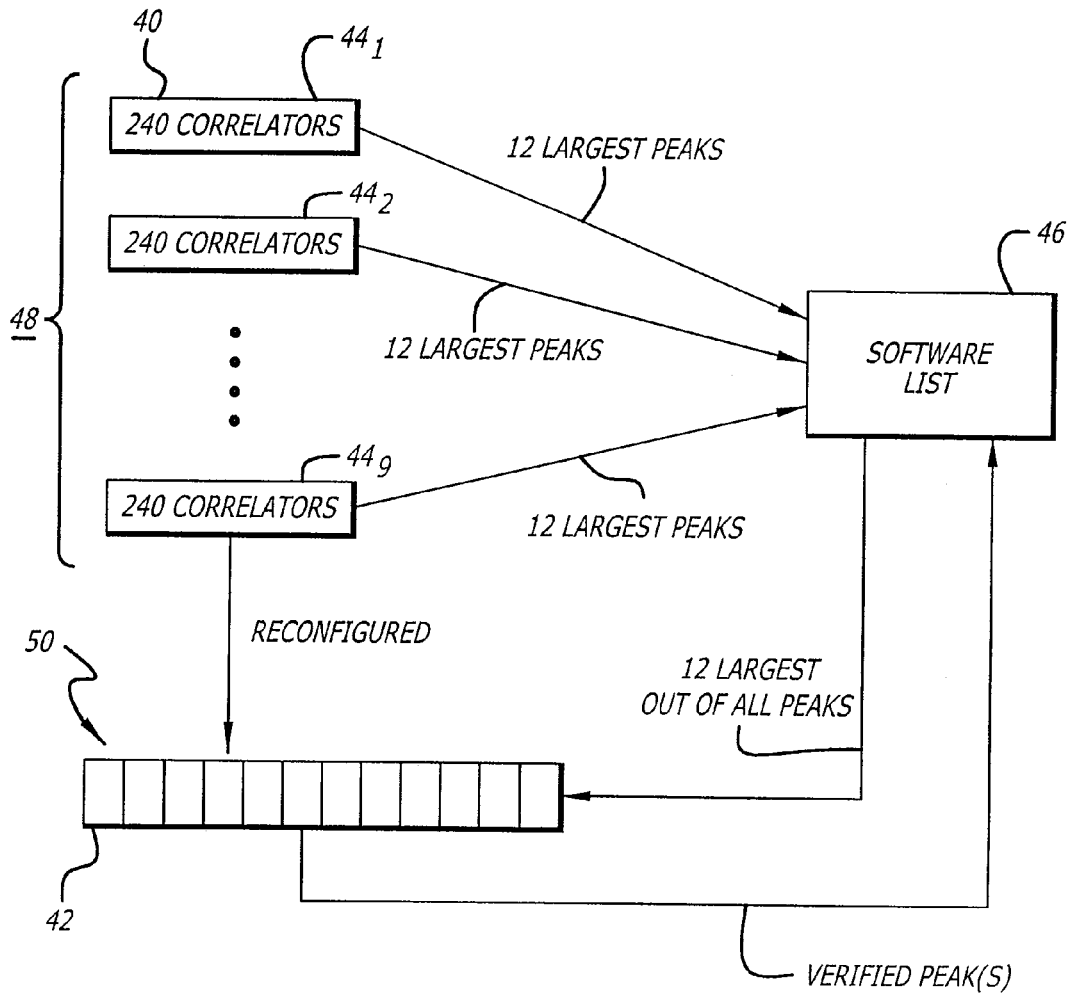
FIG. 3 is a block diagram of an acquisition process performed in accordance with another embodiment of the present invention.

With reference to FIG. 3, in an alternate embodiment of the invention, the acquisition process is applied to a GPS receiver having 240 correlators and 16 FFT taps. This GPS receiver is referred to herein a "the 240 architecture." Similar to the 511 architecture, the 240 architecture returns the largest correlation peaks following each search dwell. A second aspect of the 240 architecture is that it does not include separate tracking channels. Instead, the 240 acquisition correlators 40 can be reconfigured as twelve 20-tap tracking channels 42. Normally these are used to track twelve satellites. However, following the strategy described above, these tracking channels 42 are used as twelve independent acquisition channels for the purpose of signal verification/false alarm rejection.

Following the first search $44_1$, the hardware list of the twelve largest correlations peaks are placed on a software list 46 of the most likely detections. With 240 chips at ½-chip spacing, it takes nine searches 48 with the chip to search the entire 1023 chips of the C/A code. For the second through ninth searches $44_2$-$44_9$, the newly determined largest correlation peaks are merged with the pre-existing list, with only the top twelve peaks being retained. The result is that following the search of the complete C/A code in nine dwells, the list contains the twelve largest correlation peaks over the 2046 code positions.

Without delay, the acquisition correlator is then reconfigured as twelve independent acquisition channels 42, each assigned one of the most likely detections from the list of twelve. A verification dwell 50, typically implemented as twice the dwell length of the acquisition dwell, is then performed. The output of the verification dwell 50 replaces the software list 46.

The hardware is then reconfigured as the 240-tap acquisition correlator 40 and the acquisition process continues. Signals from the verification dwell 50 that correspond to false alarms will naturally be replaced by stronger detections from the subsequent acquisition dwells. Signals from the verification dwell 50 that correspond to the true signal will persist on the list. The software requires that a detection be verified twice (although this is a software controlled constant) before final validation as the true signal.

This implementation retains most of the advantages described above for the 511 architecture implementation. The massively parallel architecture is used to screen the large number of time/frequency cells to provide a small list of most likely detections. A sequential detector process is then used on this small list for the verification/false alarm rejection algorithm. One difference with this implementation is that the parallel and sequential detectors are run serially, and this does represent an increase in TTFF of 22%. However, this is more than offset by the time reduction associated with the reduced S/N requirements for this implementation.

The mathematics for calculating the probability of acquisition are similar to the algorithms used for the 511 architecture. For the 240 architecture, in order for the signal to be contained in the twelve most likely detections of 240 code positions, the S/N must be at least 4.42. In another GPS receiver architecture having 240 separate taps and an 8-point FFT the S/N must be at least 5.22 to insure the same 98% probability of detection. A conventional detection algorithm would require S/N values of 5.32 and 6.02 for these architectures, respectively.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A signal acquisition process comprising:
    a) calculating a first set of correlations between a segment of a satellite signal received over a first time period and a reference signal over a set of phase offset values and carrier frequency values;
    b) for each of the first set of correlations that exceeds a predetermined threshold value, identifying the carrier frequency value and the phase offset value associated with that correlation;

c) calculating a second set of correlations between a segment of the satellite signal received over a second time period with the reference signal using the frequency values and the phase offset values identified from the first set of correlations;

d) identifying the carrier frequency value and the phase associated with each of correlations that exceed the threshold value in the second set of correlations; and e) calculating a third set of correlations between a segment of the satellite signal received over a third time period with the reference signal using the set of carrier frequency values and the phase offset values associated with the first set of correlations and the carrier frequency values and the phase offset values identified from the second set of correlations.

2. The process of claim 1 wherein a portion of calculating the second set of correlations overlap in time with a portion of calculating the third set of correlations.

3. The process of claim 1 wherein calculating the third set of correlations is carried out after calculating the second set of correlations.

4. The process of claim 1 wherein six phase offsets and six carrier frequencies associated with the greatest correlations are identified from the first set of correlations.

5. The process of claim 4 wherein up to a predetermined number of carrier frequency values and phase offset values are identified from the second set of correlations.

6. A signal acquisition device comprising:

a first set of correlators adapted to repeatedly (a) perform over successive time intervals correlations over a predetermined range of phase offset values and carrier frequency values and (b) identify, for each time interval, a combination of phase offset values and carrier offset values corresponding to a predetermined number of largest correlations over that time interval; and a second set of correlators adapted to repeatedly perform correlations, for each of the successive time intervals, using the identified combination of phase offset values and carrier frequency values for that time interval and a selected subset of the phase offset values and the carrier offset values used in the immediately previous time interval.

7. The signal acquisition device of claim 6 wherein the first and second set of correlators operate in parallel.

8. The signal acquisition device of claim 6 wherein the second set of correlators uses six phase offset values and six carrier frequency values for each time interval.

9. The signal acquisition device of claim 6, further comprising an antenna for receiving GPS signals.

10. The signal acquisition device of claim 6, further comprises a microprocessor for controlling the operations of the first and second sets of correlators.

* * * * *